(12) United States Patent
Maruyama

(10) Patent No.: US 6,421,506 B1
(45) Date of Patent: Jul. 16, 2002

(54) CAMERA

(75) Inventor: Atsushi Maruyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 95 days.

(21) Appl. No.: 09/587,031

(22) Filed: Jun. 2, 2000

(30) Foreign Application Priority Data

Jun. 3, 1999 (JP) ............................................. 11-157031

(51) Int. Cl.⁷ ............................................... G03B 17/02
(52) U.S. Cl. ....................... 396/303; 396/374; 348/64; 348/333.01
(58) Field of Search ................................ 396/301, 303, 396/374; 348/64, 333.01, 333.13

(56) References Cited

U.S. PATENT DOCUMENTS 5,867,741 A * 2/1999 Maruyama et al. .......... 396/187
5,963,255 A * 10/1999 Anderson et al. ............ 348/372

FOREIGN PATENT DOCUMENTS

| JP | 0111469 A | 5/1989 |
| JP | 05181183 | 7/1993 |
| JP | 10108054 | 4/1998 |

* cited by examiner

*Primary Examiner*—David M. Gray
(74) *Attorney, Agent, or Firm*—Frishauf, Holtz, Goodman & Chick, P.C.

(57) ABSTRACT

A camera is provided which includes at least an electronic image pickup device, a display device, and a flash light emitting device. A power source supplies electric power to internal electric circuits. A charging control circuit performs charging from the power source to the flash light emitting device, and an exposure permission signal generating circuit generates an instruction signal indicative of an instruction of image pickup permission to the electronic image pickup device. The exposure permission signal generating circuit transmits the exposure permission signal when the charging control circuit judges that the charged current to the flash light emitting device is equal to or less than a given value. The camera shortens a period provided for a next photographing preparation state after a photographing operation with a flash light emitting device and simultaneously always obtains image signals which are capable of displaying properly exposed images.

11 Claims, 6 Drawing Sheets

CAMERA

This application claims benefit of Japanese Patent Application No. H11-157031 filed in Japan on Jun. 3, 1999 the contents of which are incorporated by this reference.

BACKGROUND OF THE INVENTION

1. Field of the Invention

This invention relates to a camera, and more particularly to a camera including at least: (i) an electronic image pickup which comprises an electronic image pickup device which includes an image pickup for performing the photoelectric conversion of an object image, (ii) a display for displaying images upon reception of image signals from the image pickup, and (iii) a flash light emitting device which emits a flash light to the object.

2. Related Art Statement

Conventionally, various proposals have been made with respect to a camera which has a following constitution. That is, the camera is comprised of an electronic image pickup device which includes image pickup means for converting an object image formed by a photographing optical system into electric signals and display means for displayig images indicative of image signals outputted from the image pickup means, and a silver salt photographing device which exposes an object image which is formed by a photographing optical system to a silver film. In such a camera, the image pickup operation of the electronic image pickup device is performed in an interlocking manner with an exposure operation applied to the silver film performed by the silver salt photographing device. Such proposals have been introduced by Japanese Laid-Open Patent Publication 114169/1989 and Japanese Laid-Open Patent Publication 108054/1998, for example.

The camera disclosed in Japanese Laid-Open Patent Publication 114169/1989 is constituted such that, simultaneous with the exposing of an object image which is formed by the same photographing optical system to a silver film, image signals indicative of the object image obtained by forming on a light reception plane of an image pickup element are outputted to a display device, and an image including the object image is displayed by the display device. With such a camera, the same image as exposed to the silver film can be confirmed by the display device even during the photographing operation.

In this know device, however, since the luminous flux of the object focused by a single photographing optical system is divided and led to the silver film and the image pickup element, the quantity of light which is to be irradiated respectively to the silver film and the image pickup element may suffer from shortage. In this case, particularly, when the object has a low luminance, a case that the quantity of light necessary for forming an image with proper exposure cannot be obtained may arise.

On the other hand, the camera disclosed in Japanese Laid-Open Patent Publication 108054/1998 is comprised of a silver salt photographing device which exposes an object image formed by the photographing optical system to the silver film and an electronic image pickup device which includes a photographing optical system separate from the photographic optical system of the silver salt photographing device, an image pickup element which converts the object image formed by this separate photographing optical system into electric signals and a display device which displays a corresponding image upon reception of image signals outputted from the image pickup element. Due to such a constitution, simultaneous with performing of the operation to expose the object image to the silver film, the image pickup operation by the image pickup means which includes the generation of image signals and the display of an image by the display device based on the image signals and the like is performed.

In such a camera, since the silver salt photographing device and the electronic image pickup device are respectively provided with separate photographing optical systems, the film and the image pickup element are irradiated with a sufficient quantity of light and hence, no shortage of the quantity of light occurs and the proper electronic image and the proper film image can be simultaneously obtained.

Further, conventionally, with respect to cameras such as silver salt photographing devices which perform photographing by using silver films and electronic image pickup devices which generate electric image signals by using the image pickup elements or the like and can display and record images based on image signals, cameras which integrally incorporate flash light emitting devices or so called strobe devices therein have been commercialized, wherein the strobe devices provide a proper luminance to main objects by irradiating auxiliary light to the object in case the luminance of the object suffers from low illumination intensity or the photographing is made under backlight and the like.

In conventional typical electronic image pickup devices and the like, it has been well known that at the time of reading out charges stored in each element on a light reception plane of an image pickup element such as a CCD at a high speed or in case the display of the image is performed by a display device such as an LCD, to be more specific, in case electricity is supplied to a backlight disposed on a back surface of the LCD so as to turn on the backlight, the quantity of electric power supplied from a power source such as a battery to respective electric members becomes large and correspondingly the consumed electric current of the device as a whole is liable to become excessively large rapidly.

Under such a condition which applies a heavy load to the power source, in case the charging operation of the flash light emitting device is further performed in parallel, the consumed electric current is further increased and hence, the power source voltage is reduced correspondingly and a case that a given amount of electric energy cannot be supplied to the image pickup device (CCD or the like) and the display device (LCD or the like) may arise.

Taking such a problem into account, a camera disclosed in Japanese Laid-Open Patent Publication 5/181183 is constituted such that, when the camera is driven under the condition that a heavy load is applied to an image pickup circuit part and a recording circuit part and the like, for example, in case the charging of the flash light emitting device such as a strobe device or the like is performed in parallel to driving of the camera, the power source voltage is constantly monitored and when the lowering of the power source voltage is detected, control to stop the charging operation under execution is performed. Then, when it is detected that the power source voltage is recovered by temporarily stopping the charging operation, control to start the charging operation again is performed. Such control is repeated until a given amount of charging is obtained.

With respect to the means disclosed in the above-mentioned Japanese Laid-Open Patent Publication 181183/1993, at the time of heavy load driving, the strobe device is controlled such that it performs the above-mentioned intermittent charging operations and hence, it takes a considerably long time for the strobe device to obtain the charging completion condition while securing a given charging amount. This implies that, compared to a normal charging operation, it takes a longer time until the condition that a next photographing operation which requires a light emitting operation of the strobe device is obtained, that is, until a given signal to allow the next photographing operation is supplied.

Accordingly, there has been a problem that at the time that a user wants to perform a photographing operation, the charging operation has not yet been completed and hence, the user loses a shutter chance since the camera is not in the condition which allows the performing of photographing.

Further, in case the photographing is performed under the condition which requires the emitting of light from the flash light emitting device, for example, under the condition that the luminance of the object is low, it is considered the flash light emitting device generates a next photographing permission signal without waiting for the completion of the charging operation of the flash light emitting device to assign priority to the shutter chance.

However, since a sufficient flash light emitting amount is not secured, images which are displayed based on image signals generated by such a photographing operation are considered to become images which suffer from the shortage of exposure.

Further, in the flash light emitting devices adopted by the conventional cameras, various electric noises are liable to be generated during performing of the charging operation. Accordingly, in case the charging operation is performed in parallel to performing of the recording operation of electric image signals and performing of the displaying operation of images based on the image signals, noises may be mixed into the recorded image signals thus giving rise to a problem that the image quality is deteriorated or the displayed images suffer from disturbance.

In Japanese Laid-Open Patent Publication 114169/1989 and Japanese Laid-Open Patent Publication 108054/1998, the above-mentioned problems are not referred to at all and there exists no description which suggests that these problems exist The present invention has been made in view of the above-mentioned problems.

SUMMARY OF THE INVENTION

It is the first object of the present invention to provide a camera providing both silver salt photographing and electronic image pickup which is comprised of an electronic image pickup device which includes an image pickup for performing a photoelectric conversion of an object image and a display which displays an image, a silver salt photographing device for exposing an object image to a silver film, and a flash light emitting device for emitting a flash light, the improvement being characterized in that the time which is necessary from a point of time that a photographing operation was performed by using the flash light emitting device to a point of time that a condition which enables a next photographing operation becomes ready can be shortened and image signals and film images which ensure the image of a proper exposure can be always obtained.

It is the second object of the present invention to provide a camera providing both silver salt photographing and electronic image pickup which generates no trouble in the image pickup operation and the image display operation even in case the image pickup operation is performed by making use of the flash light emitting device.

To briefly explain the present invention, the first aspect of the invention is directed to a camera which includes a silver salt photographing section which is capable of exposing an object image to a silver film, an image pickup section which converts the object image into electric image signals and stores the electric signals therein in an interlocking manner with the silver salt photographic section, and a monitor which displays images based on image signals picked up by the image pickup section the improvement being characterized in that the camera further includes flash light emitting device which irradiates a flash light to an object by discharging a charge stored in a capacitor to a light emitting tube, a charging device which charges the capacitor, and control means which measures a charged voltage of the capacitor during the charging operation of the charging device and controls a display condition of the monitor in response to a result of the measurement.

Further, a second aspect of the invention is directed to a camera which includes a silver salt photographing section which exposes an object image to a silver film and an image pickup section which converts the object image into electric image signals and stores the electric signals therein, the improvement being characterized in that the camera further includes a monitor which displays images in response to the image signals picked up by the image pickup section, a flash light emitting device which irradiates a flash light to the object image by discharging the charge stored in a capacitor to a light emitting tube during the operation of the image pickup section, a charging device which charges the capacitor, and a measuring device which measures a charged voltage of the capacitor during the charging operation of the charging device and control means which permits or prohibits the display of the monitor in response to a result of the measurement.

Still further, a third aspect of the invention is directed to a camera which includes a silver salt photographing section which exposes an object image to a silver film and an image pickup section which converts the object image into electric image signals and stores the electric signals therein, the improvement being characterized in that the camera further includes a monitor which displays images in response to the image signals picked up by the image pickup section, a flash light emitting device which irradiates a flash light to an object by discharging a charge stored in a capacitor to a light emitting tube during the operation of the image pickup section, a charging devices which charges the capacitor, and control means which prohibits at least the operation of the image pickup section and the operation of the monitor until the charged current of the charging means becomes equal to or less than a given value.

A fourth aspect of the invention is directed to a camera which exposes an object image to a silver film and is comprised of an image pickup circuit which includes an image pickup element which picks up an object image, a drive circuit which drives the image pickup element, a signal processing circuit for processing image signals picked up by the image pickup element, a display circuit which performs processing for displaying images based on image signals processed by the image pickup circuit, a strobe circuit which includes a flash light emitting tube, a capacitor for strobe, a charging circuit which makes the capacitor store the charge therein, a measuring circuit which measures the charged voltage of the capacitor and a light emitting circuit for performing processing for discharging charges stored in the capacitor in the flash light emitting tube, and a control circuit which supplies control signals to respective circuits, wherein the control circuit performs control such that, after operating the charging circuit, the control circuit prohibits processing for display performed by the display circuit until the measuring circuit detects that the charged voltage of the capacitor reaches a given value.

These and other objects and advantages of the present invention will become further apparent from the following detailed explanation.

The present invention provides a camera providing both silver salt photographing and electronic image pickup which is comprised of an electronic image pickup device which includes image pickup means for performing a photoelectric conversion of an object image and a display which displays images, a silver salt photographing device for exposing an object image to a silver film, and a flash light emitting device for emitting a flash light, and is capable of immediately performing a next photographing operation after performing the photographing operation by using the flash light emitting device and is always capable of obtaining image signals which ensure images of a proper exposure.

Further, the present invention provides a camera providing both silver salt photographing and electronic image pickup which generates no trouble in the image pickup operation and the image display operation even in case the image pickup operation is performed by making use of the flash light emitting device.

DETAILED DESCRIPTION OF THE PREFERRED EMBODIMENTS

Figure 1:
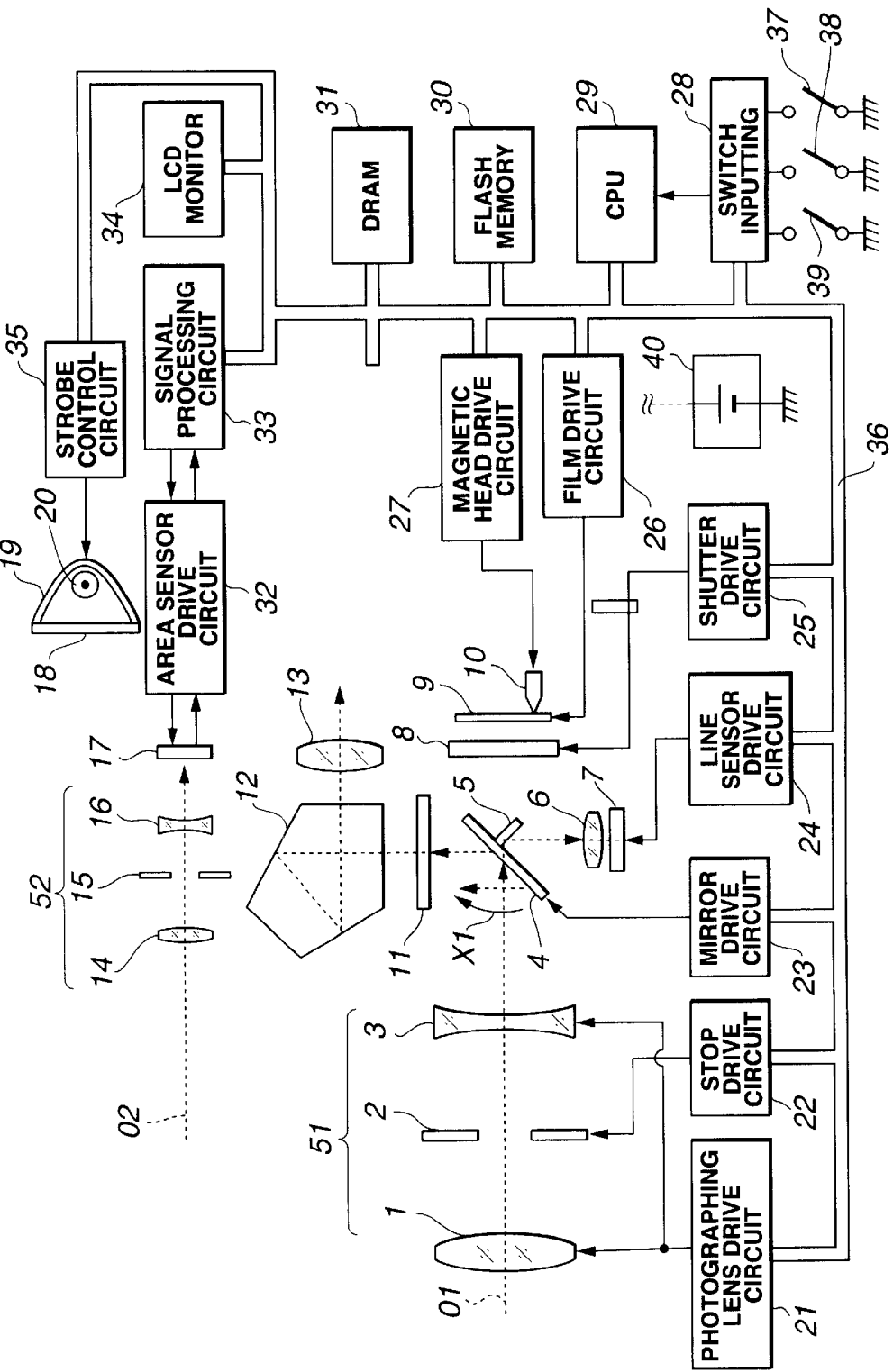
FIG. 1 is a block diagram showing a main part of a camera providing both silver salt photographing and electronic image pickup according to one embodiment of the present invention.

The camera of the present invention is a camera providing silver salt photographing and electronic image pickup which includes silver salt photographing means which is capable of exposing object images to a silver film, image pickup means which converts the object images into electric image signals in an interlocking manner with the silver salt photographing means and stores the electric image signals therein, and monitor means which display images based on the image signals picked up by the image pickup means. That is, as shown in the block diagram of FIG. 1, the camera of the present invention comprises a section related to the electronic image pickup device, a section related to a silver salt photographing device (silver salt photographing means), a section related with a flash light emitting device which emits a flash light to the object, a group of manipulating input switches (switch inputting unit 28) which generate given command signals or control signals in an interlocking manner with various manipulating members, and other various electric. circuits and the like. In the construction of FIG. 1, the section related to the electronic image pickup device is comprised of a first photographing optical system 52 which includes a plurality of lenses and the like, image pickup means such as an image pickup element 17 which converts an object image formed by the first photographing optical system 52 into electric signals, an LCD monitor 34 such as a liquid crystal display which constitutes a display device or display means for displaying corresponding images in response to image signals outputted from the image pickup means, and a flash memory 30 such as a nonvolatile memory which constitutes recording means for recording obtained image signals in a given form. The section related to the silver salt photographing device (silver salt photographing means) includes a second photographing optical system 51 formed of a plurality of lenses and the like which are different from those of the first photographing optical system 52 and a viewing optical system (finder optical system) such as a pentaprism 12 and the like which forms an object image for viewing upon receiving the luminous flux from the object which passes through the second photographing optical system 51 (hereinafter called "object luminous flux") and exposes the object image formed by the second photographing optical system 51 to a silver film. All electric circuits in the camera are controlled in a comprehensive manner by a CPU 29 which comprises constitutes control means.

The section related to the silver salt photographing device is explained hereinafter.

As shown in FIG. 1, the second photographing optical system 51 comprises a plurality of lenses such as a positive lens (convex lens) 1 and a negative lens (concave lens) 3 and a second stop mechanism 2 and the like which are disposed at given coaxial positions on an optical axis O1 of a plurality of these lenses. The second photographing optical system 51 is a so-called zoom lens which is capable of performing a variable magnification for continuously changing the focal length.

The positive lens 1 and the negative lens 3 are subjected to a drive control performed by a photographing lens drive circuit 21 and a given automatic focus adjustment operation (AF operation. A given variable magnification operation (zooming operation) can be performed with such a constitution. Further, the second stop mechanism 2 is subjected to a drive control performed by a stop drive circuit 22 and the control of the stop mechanism 2 for the exposure adjustment operation is performed by means of the stop drive circuit 22.

The second photographing optical system 51 which is comprised of the positive lens 1, the negative lens 3 and the second stop mechanism 2 and the like, and the electric circuits such as the photographing lens drive circuit 21 and the stop drive circuit 22 and the like are respectively arranged at given positions in the inside of a second lens barrel (not shown in the drawings) which works as a retaining member which retains them.

The photographing lens drive circuit 21 includes a drives source such as a typical electromagnetic motor or an ultrasonic motor or the like, a driver circuit for controlling the drive source, and an encoder device or the like which detects the positions of respective lenses by generating given signals corresponding to the movement of the positive lens 1 and the negative lens 3 (The detailed illustration by drawing of the photographing lens drive circuit 21 is omitted here).

At a given position on the optical axis O1 behind the second photographing optical system 51, a movable mirror 4 which has an approximately central portion thereof formed of a half mirror, a semitransparent mirror or the like and has one end portion rotatably and pivotally supported by an inner fixed member (not shown in the drawing) of the camera is arranged. Under the condition that the photographing operation is not performed (called "photographing preparation condition"), the movable mirror 4 is arranged in an inclined manner making a given angle, for example, an angle of approximately 45 degrees relative to the optical axis O1 of the second photographing optical system 51 and making a reflection surface thereof directed toward the second photographing optical system 51 side (object side) and upwardly.

The movable mirror 4 is electrically connected with a mirror drive circuit 23 and the mirror drive circuit 23 performs a drive control of the movable mirror 4 upon receiving given control signals from the CPU 29. That is, a so-called quick return mechanism is constituted by the movable mirror 4 and the mirror drive circuit 23.

Accordingly, when the camera of the present invention is under the photographing preparation condition, a portion of luminous flux of the object which passes through the second photographing optical system 51 is reflected upwardly on the reflection surface of the movable mirror 4 and is led to a viewing optical system (hereinafter called "finder optical system") which is arranged above the movable mirror 4.

On the other hand, on an approximately central portion of a back side of the movable mirror 4, a sub mirror 5 which is formed of a full reflection mirror is mounted such that the sub mirror 5 is rotatable relative to the movable mirror 4. This sub mirror 5 has a role of reflecting the luminous flux of the object which passes through the half mirror portion disposed at the approximately central portion of the movable mirror 4 and of leading the reflected luminous flux to a given position below the sub mirror 5. The sub mirror 5 is also subjected to a drive control by means of the above-mentioned mirror drive circuit 23.

At a given position on a reflection optical axis of the sub mirror 5 and below the sub mirror 5, a separator optical system 6 which is comprised of two optical systems and divides the luminous flux of the object in two images is disposed. At a position where the object image is formed again by the separator optical system 6, a line sensor 7 is disposed. A line sensor drive circuit 24 is electrically connected to the line sensor 7. The line sensor drive circuit 24 performs a drive control of the line sensor 7 upon receiving given control signals from the CPU 29.

A focus detection device which makes use of a typical phase difference detection method comprises the sub mirror 5, the separator optical system 6, the line sensor 7 and the line sensor drive circuit 24 and the like. In this case, the CPU 29 calculates a distance between two images formed by the separator optical system 6 in response to signals inputted from the line sensor 7 through the line sensor drive circuit 24 and the CPU 29 also calculates a lens drive amount and the like at the time of performing the focus adjustment operation. The information which are calculated such as the drive amount and the like, that is, outputs such as lens drive amount and the encoder device (lens position information) and th e like which are calculated upon receiving outputs (integrated result) from the line sensor 7 are transmitted to the photographing lens drive circuit 21 through the CPU 29, whereby the CPU 29 can control the focus adjustment operation by driving respective lenses 1, 3 of the second photographing optical system 51 to given positions (focused focal points) and simultaneously can perform the variable magnification operation.

Behind the movable mirror 4, a shutter mechanism 8 which restricts an irradiation amount of luminous flux of the object (exposure time) to a light receiving plane of the film 9 at the time of performing the exposure operation to the silver film 9 (hereinafter simply called "film") is provided. The film 9 is disposed at a given position right behind the shutter mechanism 8 with a given distance therebetween.

The shutter mechanism 8 is designed to be subjected to a drive control by the CPU 29 through a shutter drive circuit 25. For example, when the movable mirror 4 is rotated in a direction X1 shown in FIG. 1 by the mirror drive circuit 23, the shutter mechanism 8 is simultaneously subjected to the drive control performed by the shutter drive circuit 25 such that the shutter mechanism 8 is held in an opened condition for a given time. Accordingly, approximately the whole luminous flux transmitted through the second photographing optical system 51 is irradiated to the light receiving plane of the film 9 so that the object image formed by such irradiation is formed on a film emulsion plane (light receiving plane), thus ensuring a given exposure to the film 9.

As a shutter which constitutes a portion of the shutter mechanism 8, for example, a focal plane shutter or the like which is typically utilized in a conventional single-lens reflex REF camera may be adopted. In a normal case, the focal plane shutter is constituted such that by making use of a biasing force of biasing means charged prior to the exposure operation, between one end side and the other end side of the photographing plane, a front curtain and a rear curtain are caused to travel in a given direction with a given distance therebetween. The constitution of the shutter mechanism 8 allows the adopting of the focal plane shutter which have been typically commercialized conventionally and hence, the detailed explanation thereof is omitted here.

The film 9 used in the camera of the present invention is a roll-type silver film for photographing which is accommodated in a wound form in a film cartridge of a typical configuration. A magnetic recording layer which is capable of magnetically recording various information and the like is formed on a given region of the film 9 at the rear surface side of the light receiving plane, that is, the emulsion surface of the film 9. At a given camera-side position which faces the magnetic recording layer, a magnetic head 10 is disposed such that the magnetic head 10 comes into contact with the magnetic recording layer.

The magnetic head 10 is capable of magnetically recording various information to a given region (magnetic recording layer) of the film 9 and is subjected to a drive control performed by the CPU 29 through a magnetic head drive circuit 27.

Further, in the vicinity of the film 9 loaded into the inside of a main body of the camera of the present invention, a film drive circuit 26 which controls a film feeding operation is provided. The film drive circuit 26 performs a drive control and the like to automatically wind up the film 9 a given amount each time the photographing operation of, for example, one frame is completed by making use of a drive force transmitted through a film feeding mechanism (not shown in the drawing) for performing a film feeding which includes gear trains or the like. Due to such a constitution, an operation to dispose a next frame (an unexposed portion of the film) to a given position in the inside of the camera can be performed.

The operation of the above-mentioned magnetic head 10 for magnetically recording the given information onto the film 9 is performed in an interlocking manner with the winding up operation of the film 9 or the like performed by the film drive circuit 26.

On the other hand, above the movable mirror 4 and on the optical path of the luminous flux of object (hereinafter called "finder luminous flux") reflected by the movable mirror 4, a focus plate 11 which is formed such that the focus plate 11 is capable of forming an object image to be formed of the finder luminous flux (hereinafter called "viewing image") and is capable of confirming the focus condition of the viewing image, a pentaprism 12 which performs an image conversion such that the viewing image can be viewed in an erect normal image, a finder ocular portion 13 comprising a lens which forms the object image converted to the erect normal image by the pentaprism 12 again and the like are disposed. The finder optical system section comprises the focal point plate 11, the pentaprism 12, the finder ocular portion 13 and the like.

In the camera of this embodiment, as means for performing the observation of the object image, in addition to display means (LCD monitor 34) of the electronic image pickup device which will be explained later, the finder optical system which observes the object image formed optically (viewing image) is arranged in parallel.

In the camera of the present invention, the reason that the finder optical system is provided separately from the display means is as follows. A conventional typical silver salt camera is usually provided with a finder optical system for confirming a viewing image at the time of performing the photographing.

Usually, in performing the photographing, when the camera is slightly moved due to a so-called camera shake or the like during a photographing operation, there may be a case that a favorable image cannot be obtained. Accordingly, during performing of the photographing operation, it is necessary to hold the camera firmly. Here, in case the finder optical system is used, the camera is inevitably placed in the vicinity of the user's face (that is, his eye) so that the camera can be supported by a portion of his face in addition to holding of the camera with his both hands. Accordingly, in observing the viewing image by using the finder optical system, the user can firmly hold the camera and can prevent the camera shake and the like.

On the other hand, a conventional typical electronic image pickup device and the like is usually provided with display means such as a liquid crystal display or the like which displays a viewing image prior to the image pickup operation or displays the images which have been already photographed and uses this display means as a finder. To observe the images displayed by the display device, in a usual case, it is necessary for the user to move the camera per se a given distance away from his eye. Therefore, in performing the image pickup operation while confirming the viewing image by using the display means, the user has to hold the camera only with his both hands. Accordingly, in this case, compared to the case that the photographing is performed while observing the viewing image by using the optical finder, the camera holding condition is liable to be unstable so that problems such as camera shake and the like often occur. On the other hand, in case of performing the photographing operation while confirming the viewing image by making use of the display means, the camera and the user's eye are held apart from each other so that the posture of the camera is set free from any restriction, thus giving rise to an advantage that the user can easily perform the photographing at various photographing angles or the like.

Accordingly, to obtain the favorable photographing and image pickup result, the camera of the present invention is provided with two viewing means, that is, the display means which receives electric image signals and displays the viewing image corresponding to such electric image signals and the finder optical system which allows the direct observation of the viewing image which is optically formed and suitably uses these two viewing means.

A switch inputting part 28 comprises various manipulation system switches which generate given command signals in an interlocking manner with various manipulating members (not shown in the drawings) for performing various manipulations of the camera, and a plurality of switches such as detection system switches for detecting conditions of mechanical mechanisms and the like. For example, the switch inputting part 28 includes a first release switch 37 which generates a given ON signal in an interlocking manner with a first manipulation of a release button (not shown in the drawing) which constitutes a manipulating member, a second release switch 38 which generates a given ON signal in an interlocking manner with a second manipulation of the release button, a power switch 39 which generates a power source switching (ON/OFF) signal in an interlocking manner with a slide manipulating member (not shown in the drawing), a setting switch which sets desired photographing modes by generating given signals corresponding to various photographing modes and the like.

Further, the camera of the present invention includes a nonvolatile semiconductor memory (not shown in the drawing) such as a ROM or the like for storing various information such as the adjustment data or the like related to the constituent members of the camera and program diagrams for deciding the operating condition and proper exposure of the camera and the like.

The constitution of the section related to the electronic image pickup device is explained hereinafter.

The section related to the electronic image pickup device of the camera of the present invention is, as mentioned previously, comprises the first photographing optical system 52 which is formed of a plurality of lenses, image pickup means which is formed of the image pickup element 17 including an area sensor such as the CCD which converts the object image formed by the first image photographing optical system 52 into electric signals, an area sensor drive circuit 32 which performs a drive control on this image pickup element 17 and the like, the LCD monitor 34 such as the liquid crystal display which constitutes the display means for displaying images indicative of image signals outputted from the area sensor drive circuit 32, the flash memory 30 such as the nonvolatile memory which comprises recording means for recording image signals obtained by the image pickup element 17 and converted into images of a given form in a given form and the like.

The first photographing optical system 52 is provided separately from the above-mentioned second photographing optical system 51 and comprises a so-called single focal point lens which is set at a single focal length. The first photographing optical system 52 is constituted by a plurality of lenses such as a positive lens (convex lens) 14 and a negative lens (concave lens) 16 and a first stop mechanism 15 which is provided at a given coaxial position relative to an optical axis O2 of a plurality of these lenses.

By performing the drive control on the positive lens 14 and the negative lens 13 by means of a given drive circuit (not shown in the drawing), a given AF operation and the like can be performed. Further, the first stop mechanism 15 is also subjected to the drive control by a given drive circuit (not shown in the drawing) so that the exposure operation and the like can be performed.

Further, the first photographing optical system 52 which includes such as the positive lens 14, the negative lens 16, the first stop mechanism 15 and the like and electric circuits such as drive circuits related to these constituent members are held at given positions in the inside of a first lens barrel (not shown in the drawing) which serves as holding member.

Behind the first photographing optical system 52 and at a given position on the optical axis O2, the image pickup element 17 is disposed. The area sensor drive circuit 32 which performs a given image processing upon receiving image signals which are subjected to a photoelectric conversion of the image pickup element 17 is electrically connected to the image pickup element 17. A signal processing circuit 33 is connected to the area sensor drive circuit 32. The signal processing circuit 33 performs various signal processing including processing for reconverting the image signals (analogue signals) to digital signals upon receiving the image signals which are subjected to processing of the area sensor drive circuit 32.

Further, the section related to the electronic image pickup device of the camera of the present invention includes nonvolatile memory which is capable of high speed writing processing (recording processing) and is comprised of a DRAM 31 which constitutes temporary storing means capable of receiving an output from the signal processing circuit 33 and temporarily storing the output or temporarily storing image signals readout from the flash memory 30 which will be explained later, the flash memory 30 which constitutes recording means such as a nonvolatile memory and reads out and records image signals which are temporarily stored in the DRAM 31 at a given timing, the LCD monitor 34 which receives image signals from the DRAM 31 or the flash memory 30, performs an optimum signal processing for displaying them as images and performs the image display and the like.

The flash memory 30 is capable of electrically rewriting the electric image signals which are indicative of images and at the same time is capable of preserving the recorded electric image signals even under the condition that electricity is not supplied from a battery 40 as a main power source of the camera of the present invention. A generally commercially available flash memory, for example, a PC card or the like having a compact card shape can be used as the flash memory 30.

The image pickup angle of the field set by the first photographing optical system 52 is set approximately equal to the angle of the field at a shortest focal point side, that is, at a so called wide end out of pickup angles of the field set by the second photographing optical system 51.

Further, when the focal length of the second photographing optical system 51 is displaced by the photographing lens drive circuit 21, that is, when the zooming operation is performed, with respect to image signals obtained at the electronic image pickup device side, a given enlarging processing or shrinking processing (a so-called electronic zooming processing) is performed in an interlocking manner with such zooming operation such that the pickup angle of the field set by the first photographing optical system 52 becomes approximately equal to the pickup angle of the field corresponding to the focal length of the second photographing optical system 51, and thereafter the image signals are outputted to the LCD monitor 34 and the corresponding image is displayed. Accordingly, the displayed angle of the field of, the electronic image displayed by the LCD monitor 34 approximately always agrees with the angle of the field of a latent image actually recorded onto the film 9.

Further, the irradiation angle of the field of the flash light irradiated from the flash light emitting device is set to be approximately equal to the image pickup angle of the field of the shortest focal point side (wide end) of the second photographing optical system 51.

The CPU 29 also plays a role of performing the calculation of the optimum stop value and the optimum shutter speed value which provide a proper exposure amount relative to a given object upon receiving various information such as the object luminance value outputted from the area sensor drive circuit 32, information on the film sensitivity detected from a magnetic recording layer of the film (or a package portion of a film cartridge) by a film sensitivity detection circuit (not shown in the drawing), program diagrams prestored in a ROM and the like disposed in the inside of the camera and the like. Then, based on the result of this calculation, the CPU 29 performs the drive control on the second stop mechanism 2 through the stop drive circuit 22 so as to set a given stop value and performs the drive control on the shutter mechanism 8 through the shutter drive circuit 25 so as to operate the shutter mechanism 8 at a given shutter speed.

The camera of the present invention is constituted such that the camera incorporates the flash light emitting device therein for lighting the object in an auxiliary manner. That is, the flash light emitting device of the camera of the present invention is comprises various members such as a strobe control circuit 35 which controls the light emitting operation of the flash light upon receiving a command signal from the CPU 29, a light emitting tube 20 such as a xenon tube in which xenon gas or the like is filled, a reflection member 19 which reflects the flash light emitted from the light emitting tube 20 so as to make the flash light irradiated in one given direction (mainly in the direction toward the object), a Fresnel lens 18 which is disposed at the front surface side of the reflection member 19 and is made of a transparent or semi-transparent member which is provided such that the member covers an opening portion through which the flash light is irradiated and focuses or diffuses the flash light to be irradiated from the flash light emitting device in a given range and the like and a given electric circuit (see FIG. 2) and the like.

In the flash light emitting device of the camera of the present invention, the light emitting operation is subjected to the drive control performed by the CPU 29 through the strobe control circuit 35 which constitutes a charging control circuit.

In this case, the CPU 29 has a so-called automatic strobe function. That is, the CPU 29 refers to the light measuring result obtained based on the object luminance value or the like outputted from the above-mentioned area sensor drive circuit 32, for example, and if the CPU 29 judges that the luminance value (measured value) of a given object which constitutes an object to be photographed is lower than the preset given luminance value, the CPU 29 makes the flash light emitting device automatically perform a given light emitting operation with a given light emitting amount by synchronizing the light emitting operation with the exposure operation of the shutter mechanism 8 performed by the shutter drive circuit 25.

Further, if the CPU 29 judges that the luminance value of the object which constitutes the object to be photographed is low, that is, if the judgment that the integrated light amount detected by the line sensor 7 is short is made due to the reason that the camera of the present invention and the environment around the object are located in a dark space or the like, the drive control of the flash light emitting device is performed through the strobe control circuit 35 in synchronism with the integrating operation of the line sensor 7 that is, in synchronism with the AF operation. Accordingly, a given light emitting operation with the given light emitting quantity is performed and hence, the AF auxiliary luminous flux for assisting the AF operation is irradiated.

The image pickup angle of the field of the image pickup element 17 and the irradiation angle of the field of the flash light of the flash light emitting device may be set such that these angles are interlocked with the zooming operation of the first photographing optical system 52. Due to such a constitution, three angles of the fields, that is, the irradiation angle of field of the flash light emitting device, the image pickup angle of the field of the electronic image pickup device and the photographing image angle of the field of the silver salt photographing device can be made always approximately equal to each other.

Further, the above-mentioned various electric circuits and the like, that is, the pickup lens drive circuit 21, the stop drive circuit 22, the mirror drive circuit 23, the line sensor drive circuit 24, the shutter drive circuit 25, the film drive circuit 26, the magnetic head drive circuit 27, the flash memory 30, the DRAM 31, the signal processing circuit 33, the LCD monitor 34, the strobe control circuit 35 and the like or various electric members are respectively electrically connected to the CPU 29 through a data bus 36. Accordingly, the transmission and reception of data formed of electric signals are performed when necessary between the CPU 29 and the electric circuits and electric members and given control signals which allow the CPU to control all of the circuits in a comprehensive manner can be transmitted to respective electric circuits and the like.

Electricity is supplied to respective circuits from the battery 40 which constitutes a main power source. In FIG. 1, for preventing the drawing from becoming cumbersome, wiring and the like which show the connections between respective circuits and the battery 40 are omitted.

Figure 2:
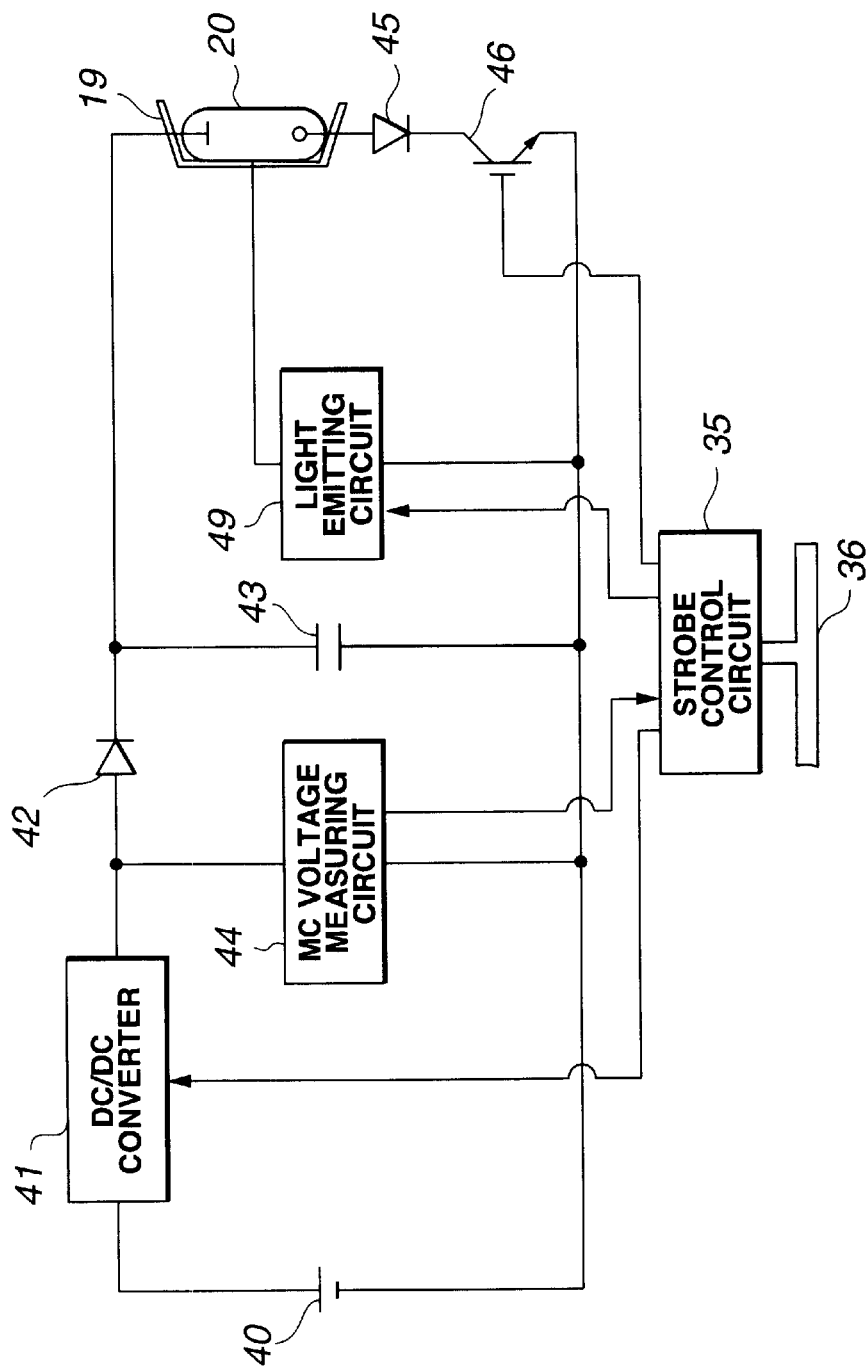
FIG. 2 is an electric circuit showing a flash light emitting device of the camera of FIG. 1.

FIG. 2 is an electric circuit diagram showing the electric circuit of the flash light emitting device of the camera of this embodiment. Here, the flash light emitting device of the camera of the present invention is explained in detail.

The electric circuit of the flash light emitting device comprises a DC/DC converter 41 which boosts an operating voltage to a given voltage upon receiving the supply of electricity from the battery 40 which constitutes the main battery of the camera of the present invention, a main capacitor 43 which receives charging of the output boosted by the DC/DC converter 41 therein, an MC voltage measuring circuit 44 which monitors the output, that is, the boosted voltage or the like of the DC/DC converter 41, a given light emitting circuit 49 for emitting flash light, and a plurality of electric parts such as diodes 42, 45, a transistor 46 and the like.

Since the electric circuit of the flash light emitting device is electrically connected to the strobe control circuit 35, the DC/DC converter 41, the light emitting circuit 49, the given transistor 46 and the like are placed under the control of the CPU 29 through the strobe control circuit 35 and the data bus 36.

Further, the outputting condition of the DC/DC converter 41 which is monitored by the MC voltage measuring circuit 44 is outputted to the strobe control circuit 35.

A plus terminal of the main capacitor 43 is connected to an anode of the light emitting tube 20 and a cathode of the light emitting tube 20 is connected to an anode of the diode 45. Further, a cathode of the diode 45 is connected to a collector of the transistor 46 and an emitter of the transistor 46 is connected to a minus terminal of the battery 40.

As the transistor 46, a typical IGBT, aMOS type transistor having a high withstand voltage or the like can be used, for example.

The manner of operation of the flash light emitting device of the camera of the present invention will now be explained.

Electric power supplied to the electric circuit of the flash light emitting device of the camera of the present invention from the battery 40 is first of all boosted to a given voltage by the DC/DC converter 41. The output of the DC/DC converter 41 is always monitored by the MC voltage measuring circuit 44. The output of the DC/DC converter 41 is fed to the main capacitor 43 through the diode 42 and is charged therein.

On the other hand, the light emitting circuit 49 which is operable upon receiving a light emitting start signal or the like from the strobe control circuit 35 generates an output of boosted high voltage. This output is transmitted to the light emitting tube 20 through the reflection member 19 disposed around the light emitting tube 20 and generates an excitation of the xenon gas filled in the light emitting tube 20. Accordingly, a given light emitting operation is performed. Here, the transistor 46 is held in the ON state by a command from the strobe control circuit 35. Accordingly, the charge stored in the main capacitor 43 flows from the anode of the light emitting tube 20 to the emitter of the transistor 46 as the light emitting current.

The light emitting amount of the light emitting tube 20 is controlled to an arbitrary light emitting amount by controlling the time in which the transistor 46 is held in the ON state. In this case, the time control to hold the transistor 46 in the ON state is performed by the CPU 29 based on the result of the light measurement or the distance measurement which is carried out prior to the photographing operation performed with the flash light emitting device.

The "main sequence" which constitutes the main operation of the camera of this embodiment having the above-mentioned constitution is explained hereinafter reference to the flow chart shown in FIG. 3.

First of all, the battery 40 which constitutes the main power source is loaded in the camera of the present invention at a given position and the power switch 39 (see FIG. 1) is manipulated to turn on the power source and hence, a given electric power is supplied to respective electric circuits of the camera of the present invention. When the CPU 29 starts its operation upon receiving the supply of given electric power, the "main sequence" shown in FIG. 3 is called. The detail of the processing of the main sequence is as follows.

In a step S1, it is judged whether the power switch 39 of the camera of the present invention is in the ON state or not. If it is confirmed that the power switch 39 is in the ON state, the processing flow advances to processing of a step S5, while if it is confirmed that the power switch 39 is in the OFF state, the processing flow advances to processing of a step S2.

If the processing flow advances to the processing of the step S2 upon confirmation of the Off state of the power switch 39 in the step S1, the CPU 29 performs or executes the "DC/DC converter OFF" processing which brings the DC/DC converter 41 into the OFF state in the step S2. Due to such processing, the charging operation to the main capacitor 43 is stopped.

Then, in a step S3, the CPU 29 performs the "display OFF instruction" processing which outputs an instruction signal for stopping (turning off) the display operation to the LCD monitor 34. Upon receiving the instruction signal, the LCD monitor 34 stops the display operation.

Subsequently, the CPU 29 performs the "first standby processing" in a step S4. This "first standby processing" is processing which is performed before the operation of the CPU 29 is stopped, for example, that is, processing which performs setting of conditions necessary for restarting the operation of the CPU 29 in the condition that the CPU 29 is stopped.

In the "first standby processing" of this embodiment, after setting conditions necessary for restarting the operation of the CPU 29 upon receiving the ON state of the power switch 39, processing to stop the operation of the CPU 29 is performed. Due to this processing, the camera of the present invention is set to the "first standby" mode.

Under this condition, if the manipulation to bring the power switch 39 into the ON state is performed, the standby state is released and the processing flow returns to the step S1 of the "main sequence" and performs processing of the step 1 and processing of ensuing steps which follow the step S1.

On the other hand, if the ON state of the power switch 39 is confirmed in the step S1 and the processing flow advances to the processing of the step S5, the CPU 29 performs the "power ON processing" in the step S5.

Subsequently, in a step S6, the CPU 29 calls for the "strobe charging" processing which is a sub routine for performing the charging of the main capacitor 43 and performs this processing. In this sub routine, an initializing (clearing) or setting of an exposure permission flag which is a flag on a command signal for permitting the photographing (exposure) operation is performed (see FIG. 4 which will be explained later in detail).

Subsequently, in a step S7, the CPU 29 performs the "first timer start" processing which starts counting of a first timer incorporated in the inside of the CPU 29. This first timer is a counter which counts up every given time. In the "first timer start" processing, first of all, the counter value is cleared to zero (or reset) and thereafter the counting is started. That is, the counter value enables the detection of the clasped time after starting of the counting by suitably reading the counter value.

In a step S8, the CPU 29 performs the judgment on whether the first release switch 37 is brought into the ON state or not due to the first manipulation of a release button (not shown in the drawing). Here, if it is confirmed that the first release switch 37 is in the OFF state, the processing flow advances to the processing in a step S14. On the other hand, if it is confirmed that the first release switch 37 is in the ON state, the processing flow advances to processing in a step S9.

In the above-mentioned step S8, when the processing flow advances to the processing of the step S9 upon confirmation of the ON state of the first release switch 37, the CPU 29 confirms the condition of the exposure permission flag in the step S9. If it is confirmed that the exposure permission flag is set, the processing flow advances to processing of a next step S10. On the other hand, if it is confirmed that the exposure permission flag is cleared, the processing flow returns to the processing of the above-mentioned step S6 and the processing of the step S6 and processing of the ensuing steps which follow the step S6 are repeated.

On the other hand, in the above-mentioned step S9, if the processing flow advances to the processing in a step S10 upon confirming that the exposure permission flag is set, the CPU 29 performs or executes the sub routine on the "light measurement" processing in this step S10. That is, the CPU 29 performs a given light measurement operation by controlling image pickup element (area sensor) 17 or the like. Due to such processing, information on the luminance value of object or the like which constitute a given light measurement result are inputted to the CPU 29 from the area sensor drive circuit 32 through the signal processing circuit 33.

Subsequently, in a step S11, the CPU 29 performs a sub routine on the "distance measurement and focus adjustment" processing. In this "distance measurement and focus adjustment" processing, first of all, the CPU 29 obtains the distance between two images based on signals inputted through the line sensor drive circuit 24 and calculates drive amount data for driving given photographing lenses of the first photographing optical system 52 such that the lenses take given focusing positions (distance measurement). The calculated drive amount data is transmitted to the photographing lens drive circuit 21. Due to such processing, the photographing lens drive circuit 21 drives the given motors, drive mechanisms and the like and move the positive lens 1, the negative lens 3 and the like of the first photographing optical system 52 to set focusing positions (focus adjustment).

Subsequently, in a step S12, the CPU 29 performs the "exposure calculation" processing where the CPU 29 calculates the stop value and the shutter speed value which allow the acquisition of the proper exposure result based on information on the luminance value of the object and the like obtained in the above-mentioned step S10, information on program diagrams or the like which are preliminarily prepared (not shown in the drawing) and film sensitivity information detected by a film sensitivity detection circuit (not shown in the drawing).

Then, in a step S13, the CPU 29 calls for the "photographing sequence" processing and performs the image pickup operation by the image pickup element 17 and the exposure operation to the film 9 simultaneously. The details of the "photographing sequence" processing are explained later (see FIG. 6).

On the other hand, in the above-mentioned step S8, if the OFF state of the first release switch 37 is confirmed and the processing flow advances to the processing of a step S14, the CPU 29 reconfirms the state of the power switch 39 in this step S14. If it is confirmed that the power switch 39 is in the ON state, the processing flow advances to the processing of a step S15. Further, if it is confirmed that the power switch 39 is in the OFF state, the processing flow advances to the processing of the step S2 and the processing of ensuing steps which follow the processing of the step 2 are performed.

In the above-mentioned step S14, if it is confirmed that the power switch 39 is in the ON state, the processing flow advances to the processing of a step S15. In the step S15, the CPU 29 confirms the state of the first timer which started the counting in the above-mentioned step S7. The first timer is set such that it overflows when a given time elapses after starting of the counting.

Then, in the step S15, the state of the first timer is confirmed and whether the state is the overflown state or not is judged. Here, if it is judged that the first timer is in the overflown state, that is, a given time has elapsed after starting of the counting, the processing flow advances to processing in a next step S16. On the other hand, if it is judged that the first timer is not in the overflown state, that is, a given time has not elapsed after starting of the counting, the processing flow returns to the processing of the above-mentioned step S8 and repeats the processing of ensuing steps which follow the processing of the step S8.

That is, in the above-mentioned step S7, if the ON manipulation of the first release switch 37 is not performed in the period from a point of time that the counting of the first timer was started to a point of time that a given time elapsed (a point of time that the counter constituted by the first timer overflows), the OFF manipulation of the power switch 39 is not performed and the power source is held in the ON state, it is judged that the camera is not used and the CPU 29 is shifted to the "second standby" mode. Due to such control, the useless consumption of electric power can be prevented.

Accordingly, in the above-mentioned step S15, if the overflown state of the first timer is confirmed and the processing flow advances to processing of a step S16, the CPU 29 brings the DC/DC converter 41 into the OFF state through the strobe control circuit 35 and hence, the charging operation to the main capacitor 43 is stopped.

Subsequently, in a step S17, the CPU 29 controls the LCD monitor 34 and outputs an instruction signal (display OFF instruction) for stopping the display operation. Upon receiving the instruction signal, the LCD monitor 34 stops the display operation.

In a step S18, the CPU 29 performs the "second standby processing". This processing is processing which is performed before stopping the operation of the CPU 29, for example, as in the case of the above-mentioned step S4, that is, processing which performs setting of conditions necessary for restarting the operation of the CPU 29 in the state that the CPU 29 is stopped.

In the "second standby processing" of this embodiment, the processing is performed such that after the condition setting is performed such that the operation of the CPU 29 can be restarted by changing the state of the first release switch 37 and the state of a mode change-over switch (not shown in the drawing) and the like, the operation of the CPU 29 is stopped. Due to such processing, the camera of the present invention becomes in the "second standby" mode.

In this state, if the manipulation to bring the first release switch 37 into the ON state or the manipulation of a mode change-over switch (not shown in the drawing) or the like is performed and hence, the change of state of either switch is detected, the second standby state is cancelled and the processing flow returns to the processing of the above-mentioned step S6 and the processing of the step S6 and the processing of ensuing steps which follow the step S6 are repeated.

The "strobe charging" processing in the flash light emitting device of the camera of the present invention is explained in detail hereinafter.

Figure 3:
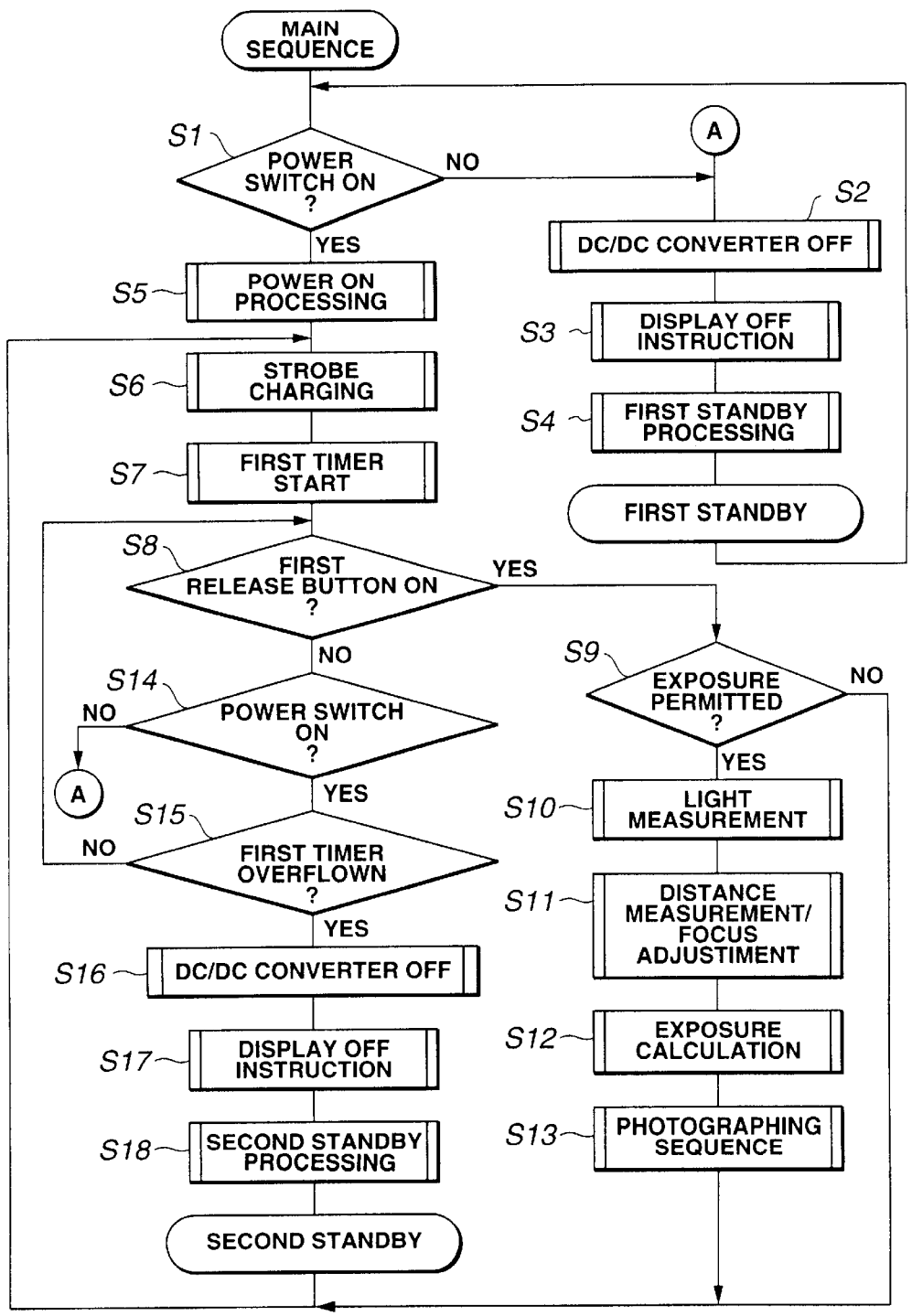
FIG. 3 is a flow chart showing a main operation sequence of the camera shown in FIG. 1.
Figure 4:
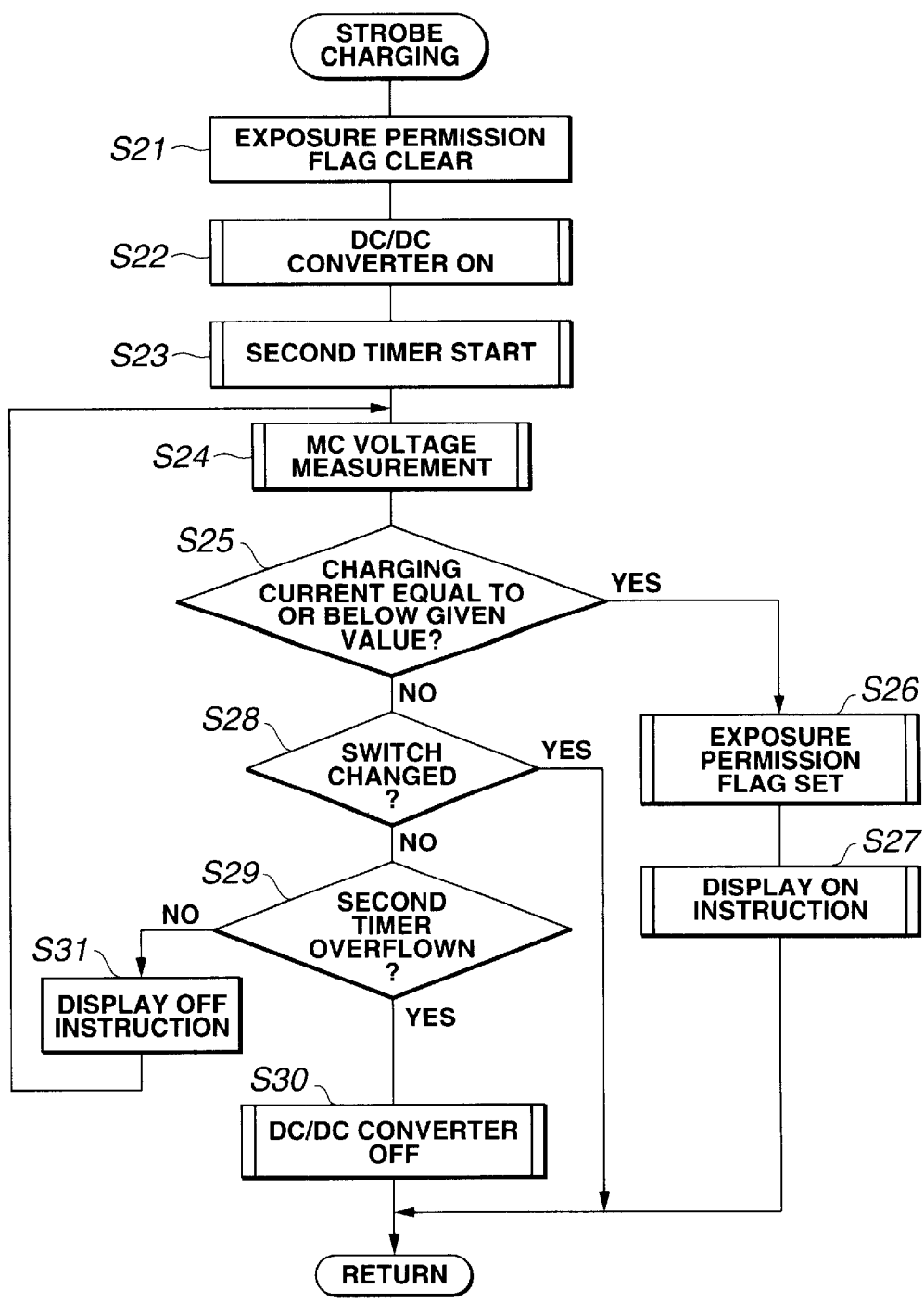
FIG. 4 is a flow chart showing details of a "strobe charging" operation of the flash light emitting device of the camera of FIG. 1.

FIG. 4 is a flow chart showing the processing of the step S6 shown in FIG. 3, that is, the sub routine of the "strobe charging" processing.

As mentioned above, if the processing flow advances to the sequence of the "strobe charging" processing in the step S6 after performing the sequence of the "power ON processing" in the step S5 of FIG. 3, first of all, the CPU 29 initializes (clears) the exposure permission flag in a step S21 shown in FIG. 4.

Subsequently, in a step S22, the CPU 29 controls the DC/DC converter 41 through the strobe control circuit 35 and brings the DC/DC converter 41 into the ON state. Due to such processing, the charging operation to charge the main capacitor 43 is started.

In a step S23, the CPU 29 performs the "second timer start" processing which starts the counting of a second timer incorporated in the CPU 29 and the processing flow advances to processing of a next step S24.

In the step S24, the CPU 29 controls the MC voltage measuring circuit 44 through the strobe control circuit 35 and monitors the charged voltage of the main capacitor 43. The measured value which is the result of charged voltage measurement is transmitted to the CPU 29.

In this case, it is well known that corresponding to the progress of the operation to store the charge to the main capacitor 43, the charged current to the main capacitor 43 is reduced and simultaneously the electric current quantity which flows in the DC/DC converter 41 from the battery 40 is reduced.

Accordingly, by measuring the voltage value of the main capacitor 43, the electric current quantity which flows in the DC/DC converter 41 at a point of time of measurement can be confirmed.

Further, it is also well known that corresponding to the decrease of the electric current quantity which flows in the DC/DC converter 41 and the main capacitor 43, electric noises generated by the DC/DC converter 41 per se can be reduced.

Subsequently, in a step S25, the electric current quantity which flows in the DC/DC converter 41 is confirmed. Here, if it is judged that the electric current quantity which flows in the DC/DC converter 41 becomes equal to or less than a given value, the processing flow advances to processing in a next step S26. On the other hand, if it is judged that the charging electric current is greater than the given value, the processing flow advances to processing in a step S28.

In the above-mentioned step S25, if it is judged that the electric current quantity which flows in the DC/DC converter 41 is equal to or less than the given value and the processing flow advances to the processing of the step S26, the CPU 29 sets an exposure permission flag and generates a signal to command the permission of the exposure operation (exposure permission signal). In this manner, the CPU 29 also plays a role of exposure permission signal generation means which generates the exposure permission signal.

Then, the processing flow advances to processing of a step S27 where the CPU 29 controls the LCD monitor 34 and generates a given command signal (ON signal) to start the display operation. Here, the image displayed on the LCD monitor 34 becomes the image which is displayed based on electronic image signals obtained by the previous photographing operation. Then, a series of sequences in the "strobe charging" processing are completed and the processing flow advances (returns) to the processing of the above-mentioned step S7 shown in FIG. 3.

On the other hand, in the above-mentioned step S25, if it is judged that the electric current quantity which flows in the DC/DC converter 41 is greater than the given value and the processing flow advances to a next step S28, the CPU 29 judges whether any changes have occurred with respect to the states of various switches, for example, the power switch 39, the first release switch 37, the second release switch 38, the mode change-over switch (not shown in the drawing) or the like or not. If it is judged that the state of a given switch is changed, the processing flow advances to the processing of the above-mentioned step S7 of FIG. 3 and the processing of the step S7 and the processing of the ensuing steps which follow the step S7 are repeated. On the other hand, if it is judged that the state of a given switch is not changed, the processing flow advances to processing of a next step S29.

In the step S29, the CPU 29 confirms the state of the second timer which started the counting in the above-mentioned step S23. In the same manner as the above-mentioned first timer, the second timer also overflows when a given time elapses after starting of the counting.

Then, in the step S29, the state of the second timer is confirmed and whether the state becomes the overflow state or not is judged. If it is judged that the second timer is in the overflown state, that is, it is judged that a given time has elapsed after starting of the counting and it is also judged that a sufficient charging is performed, the processing flow advances to processing of a next step S30.

On the other hand, if the second timer is not in the overflow state, that is, a given time has not yet passed after starting of the counting, the processing flow advances to processing of a step S31.

In the above-mentioned step S29, if the overflow state of the second timer is confirmed and the processing flow advances to the step S30, the CPU 29 brings the DC/DC converter 41 into the OFF state through the strobe control circuit 35 in this step S30. Due to such processing, the charging operation to the main capacitor 43 is stopped. Then, the processing flow advances (returns) to the processing of the step S7 shown in FIG. 3.

On the other hand, in the step S31, the CPU 29 generates an OFF instruction signal for making the LCD monitor 34 stop the display operation. Upon receiving this signal, the LCD monitor 34 performs the "display OFF instruction" processing and stops the display operation. Thereafter, the processing flow returns to the above-mentioned step S24 and the processing of the step S24 and ensuing steps which follow the step S24 are repeated.

Figure 5:
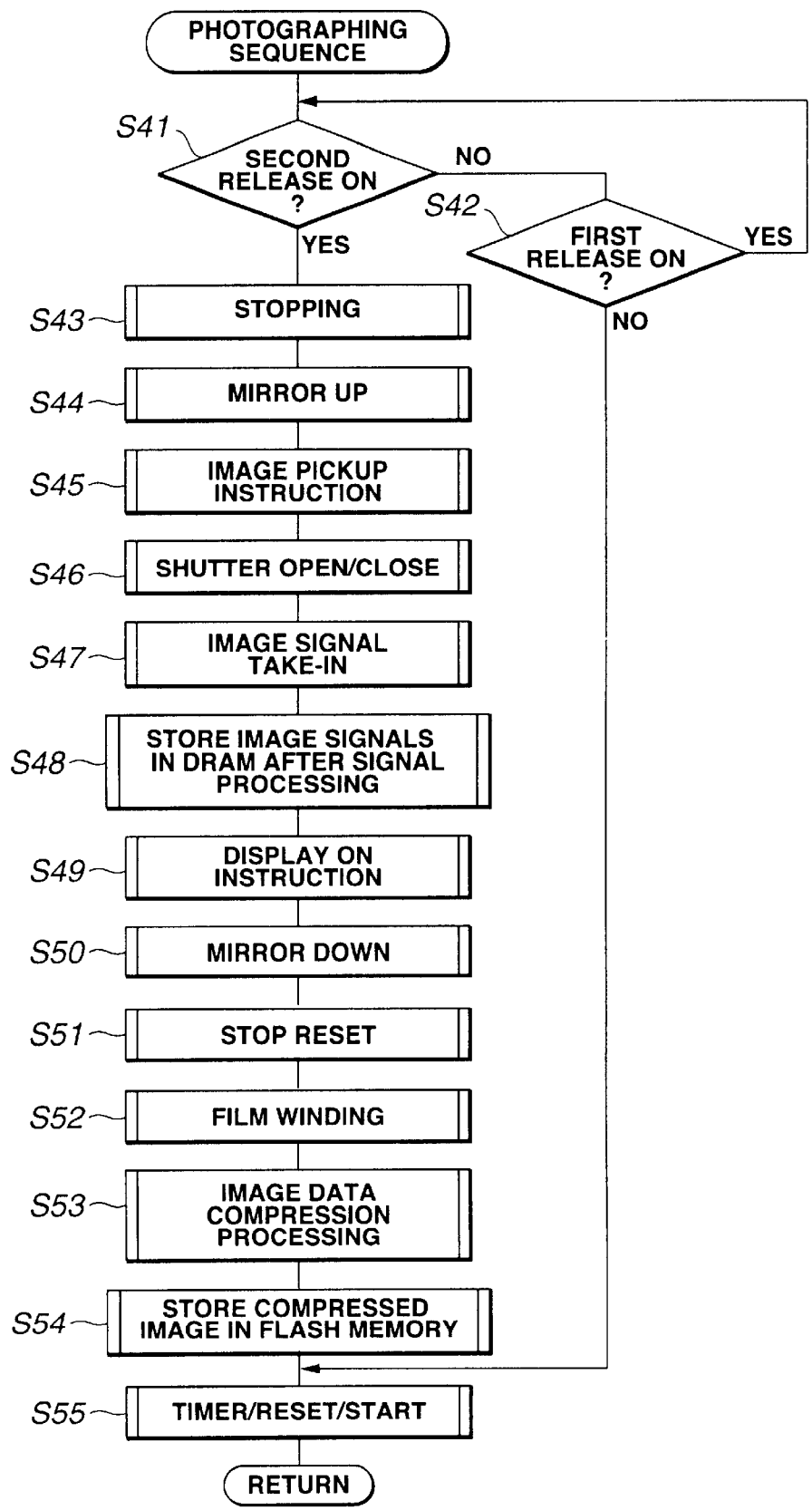
FIG. 5 is a flow chart showing a "photographing sequence" operations of the camera of FIG. 1.

The "photographing sequence" processing (see the step S13 of FIG. 3) of the camera of the present invention is explained hereinafter with reference to the flow chart shown in FIG. 5.

When the processing flow advances to the "photographing sequence" processing in the above-mentioned manner, first of all, in a step S41, the CPU 29 confirms the state of the second release switch 38. If it is judged that the second release switch 38 is not in the ON state, the processing flow advances to processing of a step S42 where the state of the first release switch 37 is confirmed in the similar manner. Then, if it is confirmed that the state of the first release switch 37 is the ON state, the processing flow returns to the above-mentioned step S41 and repeats the processing of the step S41 and the processing of ensuing steps which follow the step S41. On the other hand, if it is judged that the first release switch 37 is not in the ON state, the processing flow advances to processing of a step S55.

Then, in the above-mentioned step S41, if it is judged that the ON state of the second release switch 38 is confirmed, the processing flow advances to processing of a next step S43. In this step S43, the "stopping" processing is performed. That is, the CPU 29 performs the drive control on the second stop mechanism 2 through the stop drive circuit 22 such that a given stop value, that is, the stop value which is calculated in the "exposure calculation" processing of the above-mentioned step S12 can be obtained.

Then, in a step S44, the "mirror up" processing is performed. That is, the CPU 29 performs the drive control on the movable mirror 4 through the mirror drive circuit 23 and moves the movable mirror 4 to a position retracted from the photographing luminous flux.

Subsequently, in a step S45, the CPU 29 transmits a given image pickup instruction signal to the area sensor drive circuit 32.

Here, the control of the image pickup operation of the camera of this embodiment is performed by the area sensor drive circuit 32. Upon receiving an image pickup instruction signal from the CPU 29, the image pickup element 17 starts the image pickup operation. Upon completion of the image pickup operation by the image pickup element 17, the area sensor drive circuit 32 transmits a given take-in permission signal to the signal processing circuit 33. Upon receiving the take-in permission signal, the signal processing circuit 33 takes in image signals (analogue signals) from the image pickup element 17 and converts the image signals to digital signals by using known means. The image signals which are converted to digital signals are subjected to a given signal processing such as a signal processing for converting the digital signals to display data, for example, and thereafter are transferred to the DRAM 31 where the image signals are stored temporarily. In this manner, the image pickup operation of the object image can be performed with the use of the image pickup means such as the image pickup element 17 or the like.

Further, in parallel to this image pickup operation, the photographing operation to perform the exposure of the object image to the film 9 is performed at the silver salt photographing device side. This photographing operation is the same as the operation performed with respect to a conventional typical camera which uses a silver film.

That is, in a step S46, upon receiving the above-mentioned image pickup instruction signal, the CPU 29 performs the "shutter open/close" processing where the CPU 29 performs the drive control on the shutter mechanism 8 through the shutter drive circuit 25 at a given shutter speed value, that is, the shutter speed value calculated in the "exposure calculation" processing of the above-mentioned step S12. In this manner, the photographing operation of the object image to the film 9 can be performed.

Then, in a step S47, the "image signal take-in" processing is performed. That is, as mentioned above, the area sensor drive circuit 32 transmits the given take-in permission signal to the signal processing circuit 33. Upon transmitting this take-in permission signal, the signal processing circuit 33 takes in image signals (analogue signals) from the image pickup element 17 and converts the image signals to digital signals by using known means.

Subsequently, in a step S48, a given signal processing such as the conversion of image signals to display data or the like, for example, is applied to the image signals which are converted into digital signals in the above-mentioned step S47. After such signal processing, the image data are transferred to the DRAM 31 where the image data are temporarily stored.

Then, in a step S49, the CPU 29 instructs a signal (ON signal) to make the LCD monitor 34 start the display operation of the images. Accordingly, the images based on image signals picked up right before are displayed at the LCD monitor 34.

Subsequently, in the step S50, the "mirror down" processing which returns the movable mirror 4 which is retracted in a given position in the "mirror up" processing of the above-mentioned step S44 to a given position within the photographing luminous flux is performed.

Then, in a step S51, the "stop reset" processing which returns the second stop mechanism 2 which is set to a given stop value in the "stopping" processing of the above-mentioned step S43 to a released condition is performed.

Then, in a step S52, the CPU 29 performs the "film winding" processing by performing the drive control on the film drive circuit 26 so as to wind only one frame of the film 9 at a time. Here, the CPU 29 simultaneously performs the drive control on the magnetic head 10 through the magnetic head drive circuit 27 so as to magnetically record given information on a given magnetic recording layer of the film 9. Since the magnetic recording operation constitutes a part which the present invention is not directly relevant to, the detailed explanation of the operation is omitted.

In a step S53, a given preliminarily prepared compression processing or the like is performed on the image signals in a form of digital signals which are temporarily stored in the DRAM 31.

Subsequently, in a step S54, the image signals in a form of digital signals which are stored temporarily in a compressed form are transmitted to the flash memory 30 where the image signals are electrically recorded.

Then, in a final step S55, the CPU 29 performs the "timer/reset/start" processing and thereafter the processing flow returns to the step S6 of the main sequence shown in FIG. 3.

In the "strobe charging" processing of the flash light emitting device of the camera of the above-mentioned first embodiment, the period in which the exposure permission flag is set is judged by confirming the electric current quantity which flows into the DC/DC converter 41, that is, the charged electric current. However, the manner of judgment is not limited to the above manner and the manner of judgment is performed by the sequence which confirms the charged voltage of the main capacitor 43, for example.

Figure 6:
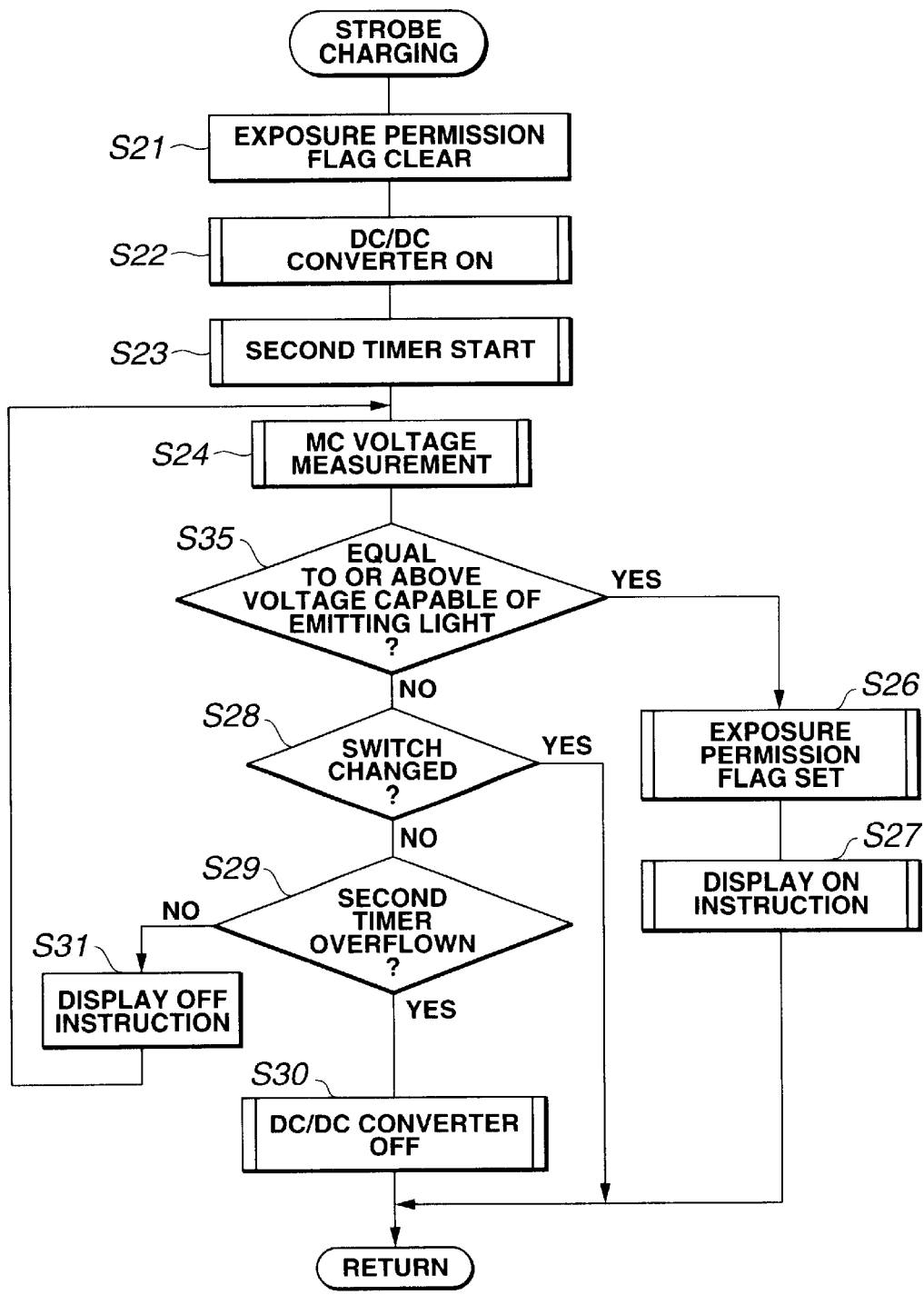
FIG. 6 is a flow chart showing a modification of the "strobe charging" operation of the flash light emitting device of the camera of FIG. 1.

FIG. 6 is a flow chart showing a modification of the "strobe charging" processing of the flash light emitting device of the camera of the above-mentioned first embodiment. As shown in FIG. 6, the modification has substantially the same processing flow as the "strobe charging" processing (see FIG. 4) of the above-mentioned first embodiment and is different from the "strobe charging" processing of the above-mentioned first embodiment only with respect to a point that the modification adopts processing (processing for confirming charged voltage) of a step S35 in place of the processing (processing for confirming charged current) of the step S25 of FIG. 4.

That is, in the step S35, the CPU 29 confirms the charged voltage of the main capacitor 43. The CPU 29 judges whether the charged voltage of the main capacitor 43 has reached a given voltage value which is necessary for making the light emitting tube 20 emit light or not. If the voltage value of the main capacitor 43 which is measured by the MC voltage measuring circuit 44 is equal to or more than the given voltage value which is necessary for making the light emitting tube 20 emit light, the processing flow advances to the processing of the step S26. Then, the exposure permission flag is set in this step S26.

Then, in the step S27, the display ON instruction which brings the display operation of the LCD monitor 34 into the ON state is performed. Other processing steps are exactly as same as those of FIG. 4 which are explained above.

In the step S26, when the exposure permission flag is set, the control to bring the DC/DC converter 41 into the OFF state may be performed. Due to such a control, the charging operation of the main capacitor 43 can be stopped. Accordingly, the power consumption is further effectively saved.

As has been described heretofore, according to above-mentioned first embodiment, in the camera providing both silver salt photographing and electronic image pickup which has both functions of the electronic image pickup device and the silver salt photographing device, if the electricity current quantity supplied to the DC/DC converter 41 becomes equal to or less than a given value, or if the voltage value of the main capacitor 43 reaches a given value or more, the exposure permission flag is set and the LCD monitor 34 is also made to start the display operation of the images.

That is, the exposure permission signal is generated after the charging operation to the main capacitor 43 is sufficiently performed and hence, for example, at the time of performing the photographing which necessitates emitting of the flash light by the flash light emitting device in an environment where the photographing environment including an object has a low luminance, the preparation for emitting the flash light is always arranged and hence, the photographing with a proper exposure can be always performed with easiness.

Further, since the exposure permission flag is set and the LCD monitor 34 is driven after electric noises at the time of a charging operation are reduced, the mixing of noises to the image signals to be recorded and the occurrence of the disturbance or the like on the images to be displayed at the LCD monitor 34 can be prevented.

Further, different from the above-mentioned conventional camera or the like, the camera of this embodiment does not adopt a so-called intermittent control which intermittently performs charging so that a given time necessary until the charged voltage reaches a voltage value which enables emitting of light becomes short so that the cases that the user loses his shutter chances is decreased.

In the present invention, it is apparent that working modes different in a wide range can be formed on the basis of the present invention without departing from the spirit and the scope of the invention. The present invention is not restricted by any specific embodiments except being limited by the appended claims.

What is claimed is:

1. A camera including a silver salt photographing section which is capable of exposing an object image to a silver film, an image pickup section which converts the object image into electric image signals and stores the electric signals therein in an interlocking manner with the silver salt photographing section, and a monitor which displays images based on image signals pickup up by the image pickup section, the improvement wherein the camera further includes:
   a flash light emitting device which irradiates a flash light to an object by discharging a charge stored in a capacitor to a light emitting tube,
   a charging device which charges the capacitor, and
   control means for measuring a charged voltage of the capacitor during the charging operation of the charging device and controlling a display condition of the monitor in response to a result of measurement.

2. A camera according to claim 1, wherein the control means permits a display by the monitor when the charged voltage of the capacitor becomes equal to or more than a given value.

3. A camera according to claim 2, wherein the control means permits a display by the monitor and also permits operation of the silver salt photographing section and the image pickup section when the charged voltage of the capacitor becomes equal to or more than a given value.

4. A camera according to claim 1, wherein the control means detects a charged current based on the charged voltage of the capacitor and permits a display by the monitor when the charged current becomes equal to or less than a given value.

5. A camera according to claim 2, wherein the control means detects a charged current based on the charged voltage of the capacitor and permits a display by the monitor and also permits next operations of the silver salt photographing section and the image pickup section when the charged current becomes equal to or less than a given value.

6. A camera including a silver salt photographing section which exposes an object image to a silver film and an image pickup section which converts the object image into electric image signals and stores the electric image signals therein, the improvement wherein the camera further includes:
- a monitor which displays images in response to the image signals picked up by the image pickup section,
- a flash light emitting device which irradiates a flash light to an object by discharging a charge stored in a capacitor to a light emitting tube during an operation of the image pickup section,
- a charging device which charges the capacitor,
- a measuring device which measures a charged voltage of the capacitor during the charging operation of the charging device, and
- control means for permitting or prohibiting a display by the monitor in response to a result of measurement of the measuring device.

7. A camera according to claim 6, wherein the control means prohibits the display by the monitor until the charged voltage reaches a given value and permits the display by the monitor when the charged voltage reaches the given value.

8. A camera according to claim 7, wherein the control means stops the charging operation without permitting the display by the monitor when the charged voltage does not reach a given value even when a given time elapses after starting of the charging.

9. A camera including a silver salt photographing section which exposes an object image to a silver film and an image pickup section which converts the object image into electric image signals and stores the electric image signals therein, the improvement wherein the camera further includes:
- a monitor which displays images in response to the image signals picked up by the image pickup section,
- a flash light emitting device which irradiates a flash light to an object by discharging a charge stored in a capacitor to a light emitting tube during the operation of the image pickup section,
- a charging device which charges the capacitor, and
- control means for prohibiting at least the operation of the image pickup section and the operation of the monitor until the charged current of the charging device becomes equal to or less than a given value.

10. A camera which exposes an object to a silver film, comprising:
- an image pickup circuit including an image pickup element which picks up an object image, a drive circuit which drives the image pickup element and a signal processing circuit which processes image signals picked up by the image pickup element,
- a display circuit which performs processing for displaying images based on image signals processed by the image pickup circuit,
- a strobe circuit which includes a flash light emitting tube, a capacitor for strobe, a charging circuit which causes the capacitor to store a charge therein, a measuring circuit which measures a charged voltage of the capacitor and a light emitting circuit for performing processing for discharging charges stored in the capacitor in the flash light emitting tube, and
- a control circuit which supplies control signals to respective circuits,
    - wherein the control circuit performs control such that, after operating the charging circuit, the control circuit prohibits processing for display performed by the display circuit until the measuring circuit detects that the charged voltage of the capacitor reaches a given value.

11. A camera comprising:
- an image pickup section which converts an object image into electric image signals;
- an image display section which displays images corresponding to the electric image signals picked up by the image pickup section;
- a flash light emitting device which irradiates flash light by discharging a charge stored in a capacitor;
- a charging device which charges said capacitor; and
- control means for prohibiting operation of at least said image pickup section and said image display section until a charged current of said charging device becomes equal to or less than a predetermined value.

* * * * *